United States Patent
Liu et al.

(10) Patent No.: US 7,634,329 B2
(45) Date of Patent: Dec. 15, 2009

(54) INTELLIGENT AIRCRAFT SECONDARY POWER DISTRIBUTION SYSTEM THAT FACILITATES CONDITION BASED MAINTENANCE

(75) Inventors: Zhenning Z. Liu, Mississauga (CA); Wenjiang Yu, Mississauga (CA); Yang Ye, Mississauga (CA); Rocco DiVito, Toronto (CA); Randy J. Fuller, Hillsburgh (CA); Guangjun G. Liu, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 254 days.

(21) Appl. No.: 11/682,190

(22) Filed: Mar. 5, 2007

(65) Prior Publication Data
US 2008/0217471 A1 Sep. 11, 2008

(51) Int. Cl.
G05D 17/00 (2006.01)
G06F 1/28 (2006.01)
(52) U.S. Cl. .................................................. 700/292
(58) Field of Classification Search .................. 700/79, 700/286, 292, 22; 323/909; 361/1, 62; 702/33–35; 713/300, 310
See application file for complete search history.

(56) References Cited

U.S. PATENT DOCUMENTS

| | | | |
|---|---|---|---|
| 4,740,883 A * | 4/1988 | McCollum | 700/22 |
| 5,466,974 A | 11/1995 | Sutrina et al. | |
| 5,752,047 A * | 5/1998 | Darty et al. | 713/300 |
| 6,273,771 B1 * | 8/2001 | Buckley et al. | 440/84 |
| 6,664,656 B2 * | 12/2003 | Bernier | 307/9.1 |
| 6,801,027 B2 * | 10/2004 | Hann et al. | 323/282 |
| 6,801,942 B1 * | 10/2004 | Dietrich et al. | 709/225 |
| 6,937,164 B2 * | 8/2005 | Thomson et al. | 340/945 |
| 6,999,996 B2 * | 2/2006 | Sunderland | 709/208 |
| 7,007,179 B2 * | 2/2006 | Mares et al. | 713/310 |
| 7,020,790 B2 | 3/2006 | Mares | |
| 7,046,166 B2 * | 5/2006 | Pedyash et al. | 340/870.07 |
| 7,046,638 B1 * | 5/2006 | Klausner et al. | 370/313 |
| 7,081,729 B2 | 7/2006 | Chang et al. | |

(Continued)

OTHER PUBLICATIONS

Lautner et al.; Electrical Load Management for Advanced Aircraft Electrical Systems; *IEEE Proceedings of the National Aerospace and Electronics Conference*, 1977, p. 194-202; CODEN: NASEA9; Conference: IEEE Proc Natl Aerosp Electron Conf NAECON '77, May 17-19, 1977, Dayton, OH, USA ; Publisher: IEEE (77CH1203-9 NAECON).

(Continued)

*Primary Examiner*—M. N. Von Buhr
(74) *Attorney, Agent, or Firm*—Oral Caglar, Esq.

(57) ABSTRACT

An electrical power distribution system comprises a solid state power controller in communication with an aircraft system main data bus via a gateway module and a condition based maintenance module in communication with the solid state power controller via a communication network distinct from the main data bus. A method of load/feeder health assessment for an electrical power distribution system includes applying a controlled excitation to a load; sampling information from the load/feeder system for the load; characterizing a normal behavior of the load/feeder system for the load; determining if the load characteristics are within the normal behavior profile for the load; and shutting down power to the load if load characteristics are not within the profile when immediate action is indicated or generating a health message for the load when immediate action is not required.

13 Claims, 4 Drawing Sheets

U.S. PATENT DOCUMENTS

| | | | |
|---|---|---|---|
| 7,103,456 B2 * | 9/2006 | Bloch et al. | 701/3 |
| 7,131,136 B2 * | 10/2006 | Monroe | 725/105 |
| 7,177,125 B2 * | 2/2007 | Lazarovich et al. | 361/42 |
| 7,363,149 B2 * | 4/2008 | Klausner et al. | 701/207 |
| 7,489,992 B2 * | 2/2009 | Valette et al. | 701/33 |
| 7,505,820 B2 * | 3/2009 | Plivcic et al. | 700/22 |
| 2005/0187738 A1 * | 8/2005 | Zuzuly et al. | 702/183 |
| 2005/0212523 A1 | 9/2005 | Chang et al. | |
| 2006/0071559 A1 * | 4/2006 | Hanson et al. | 307/43 |
| 2006/0101296 A1 | 5/2006 | Mares et al. | |
| 2006/0165023 A1 * | 7/2006 | Faulkner et al. | 370/310 |
| 2007/0027655 A1 * | 2/2007 | Schmidt | 702/188 |
| 2007/0081284 A1 * | 4/2007 | McAvoy et al. | 361/62 |
| 2007/0115938 A1 * | 5/2007 | Conzachi et al. | 370/352 |
| 2007/0239325 A1 * | 10/2007 | Regunath | 701/3 |
| 2007/0249319 A1 * | 10/2007 | Faulkner et al. | 455/402 |
| 2008/0150360 A1 * | 6/2008 | Vezza et al. | 307/31 |
| 2008/0231112 A1 * | 9/2008 | Fuller et al. | 307/9.1 |
| 2008/0303353 A1 * | 12/2008 | Yu et al. | 307/131 |
| 2009/0021874 A1 * | 1/2009 | Divito et al. | 361/57 |

OTHER PUBLICATIONS

Keller et al.; Aircraft electrical power systems prognostics and health management; Aerospace Conference, 2006 IEEE; Publication Date: Mar. 4-11, 2006; p. 12 pp.-;ISBN: 0-7803-9545-X; INSPEC Accession No. 9095969; Digital Object Identifier: 10.1109/AERO.2006. 1656087; Posted online: Jul. 24, 2006 08:56:51.0.

Dev Tolani et al.; Diagnostics, Prognostics, and Health Management (DPHM): from theory to practice; WorkShop ACC-2006; Organizer: Intelligent Automation, Inc.; 15400 Calhoun Drive Suite 400; Rockville, MD 20855; 301-294-4630; www.i-a-i.com.

F. Rufus; Aircraft EPS Diagnostics and Health Management Navy STTR FY2006; http://www.navysbirprogram.com/NavySearch/Award/award.aspx?pk=d18aad01-2e50-461b-90bf-a8139c480173.

* cited by examiner

INTELLIGENT AIRCRAFT SECONDARY POWER DISTRIBUTION SYSTEM THAT FACILITATES CONDITION BASED MAINTENANCE

BACKGROUND OF THE INVENTION

The present invention generally relates to more electric aircraft and, more particularly, to electric power distribution systems and condition based maintenance for aircraft.

There has been a growing trend in developing more electric aircraft (MEA). The MEA concept employs an overall system approach to optimizing the airframe and engine systems of aircraft on the premise that significant benefits can be achieved by replacing today's pneumatic, hydraulic and electric airframe power systems with predominantly electric power. The trend toward MEA creates increased demands for electric power and more sophisticated power distribution and load management systems. As a result, more and more intelligence has been incorporated into such aircraft electric power distribution and load management systems, leading to opportunities for the integration of such systems with other aircraft functions. For example, integrated modular avionics (IMA) and aircraft system health monitoring functions may be integrated with a power distribution system due to the fact that the power distribution system has access to a significant portion of aircraft equipment.

The trend toward more electric aircraft, at the same time, accelerates the incorporation into aircraft of electrical components that are flight-critical—such as actuators, and fuel and hydraulic system pumps and valves. Aircraft operators, in the mean time, driven by safety and cost concerns, have gradually shifted their focus in maintaining electric equipment from the traditional time based maintenance (TBM)—a reactive approach based on tracking the in-service time of each component—toward a more proactive condition based maintenance (CBM) based on sensing the actual condition of each component. CBM may be applicable, for example, to electrical actuators, electrical fuel system components (pumps and valves), arc fault protection, wiring, power generation components, avionics, and fan motors.

For example, the introduction of high voltage DC systems accentuates the problem of arcing of electrically powered systems, which is a major safety concern for aircraft. Arcing may be categorized as series, parallel, or wet arcing. Series arcs are typically caused by vibration that causes intermittent arcing due to a poor or loose connection within a circuit. Such series arcs typically create a lot of heat in a short space of time. They are difficult to locate at an early stage during ground maintenance and are a major fire hazard. Parallel arcs are shorts between adjacent wires or of a wire to a structure. They are typically caused by insulation breakdown (e.g., chafing) or abrasion of a wire bundle. Parallel arcs are also a major fire hazard. Wet arcs are the shorting between two adjacent damaged cables by an electrolyte. Typically, aircraft are susceptible to wet arcing in the undercarriage and wing fold areas where moisture, cleaning fluid, oil, and hydraulic fluid leaks are common. In commercial aircraft such conditions can occur under the toilets.

Methods to accurately predict impending failure of electrical loads and to predict and protect against arcing faults in aircraft wiring can form an important part of any condition based maintenance program. CBM may provide more reliable and cost effective maintenance through the extensive use of sensing signals, sophisticated software programming, and data processing to track the health of the system under consideration.

In an advanced aircraft secondary power distribution system (SEPDS), every electric load using secondary power may be controlled by a load management module (LMM) capable of sampling the instantaneous load current and voltage. These load current and voltage measurement signals can constitute the key characteristics of a majority of electric loads and their feeders (i.e., wirings), and can be used along with other necessary information to determine the health of the load and feeder systems.

As can be seen, there is a need for a more integrated aircraft secondary power distribution system which not only performs the traditional electric load management functions, including control and protection, but also integrates health monitoring functions and prognostic information for the loads and feeders that connect to the secondary power distribution system.

SUMMARY OF THE INVENTION

In one embodiment of the present invention, an electrical power distribution system comprises a solid state power controller in communication with a main data bus via a gateway module and a condition based maintenance module in communication with the solid state power controller via a communication network distinct from the main data bus.

In another embodiment of the present invention, an aircraft secondary electrical power distribution system comprises a solid state power controller that manages power for a load and is in communication with a wireless communication network; a remote sensor in proximity to the load and operable to sense a health condition of the load, wherein the remote sensor is in communication with the solid state power controller over the wireless communication network; and a condition based maintenance module in communication with the solid state power controller over the wireless communication network.

In still another embodiment of the present invention, a method of load/feeder health assessment for an electrical power distribution system comprises applying a controlled excitation to a load; sampling information from the load/feeder system for the load; and characterizing a normal behavior of the load/feeder system for the load.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, embodiments of the present invention integrate into an electrical secondary power distribution system the health monitoring and prognostic information functions with the conventional electric load management functions—such as control and protection—for all the loads and feeders (i.e. wirings) that connect to the system. Embodiments may be especially useful for commercial and military aircraft, and may also be applicable to any type of vehicle—such as automobiles, trucks, and ships—where vehicle complexity justifies use of an electrical secondary power distribution system. Embodiments used by military and commercial aircraft may increase mission reliability rate and reduce life cycle ownership costs for the aircraft.

In an advanced aircraft secondary electrical power distribution system (SEPDS), every electric load using secondary power may be controlled by a solid state power controller (SSPC), capable of sampling the instantaneous load current and voltage. These sampling signals have already constituted the key characteristics of the majority of electric loads and their feeders (wirings), which could be used along with other necessary information to determine the health of the load/feeder systems. Therefore, one embodiment of the present invention may upgrade an SEPDS to a more integrated aircraft system, which not only performs the traditional electric load management functions, including control and protection, but may also provide the health monitoring function and prognostic information for all the loads and feeders that connect to the more integrated aircraft secondary electrical power distribution system.

Embodiments of the present invention may differ from prior art, conventional secondary electrical power distribution systems by introducing wireless communication capability into the conventional solid state power controller SSPC modules of the SEPDS and adding a condition based maintenance (CBM) module to the SEPDS that allows the communication of remote sensing signals (not present in typical prior art SEPDS) to the SSPC and CBM modules. Alternative embodiments may further distinguish from the prior art by introducing the wireless communication capability not only to the SSPC module but also individually to each SSPC channel of the SSPC module. For example, one implementation of the invention may rely on the SSPC supervisory controller to collect the remote sensing signals, while another implementation may implement the communication capability for each individual SSPC channel, of which a multiple number may be controlled by a single supervisory controller.

The wireless communication capability embodied by the present invention may, in contrast to prior art, allow the SSPC modules of an SEPDS to receive the information (other than the load current and voltage) from remote sensors necessary in determining the health condition of the load/feeder system. The wireless communication capability embodied by the present invention also may, in contrast to prior art, serve as a backup mechanism for the SSPC channel controls in case of lost communication from the SEPDS internal serial data bus and upstream communication chains so that a significant relaxation for the criticality of these communication chains may result in comparison to the criticality of comparable communication chains in prior art SEPDS.

In addition, one embodiment of the present invention provides a method for electric load/feeder health assessment based on the application of purposely controlled excitations to the load, and the characterization of the normal behavior of the load/feeder system, in contrast to a typical prior art approach of feature extraction of the fault (non-normal behavior), which could produce a potentially infinite number of characterization possibilities.

Figure 1:
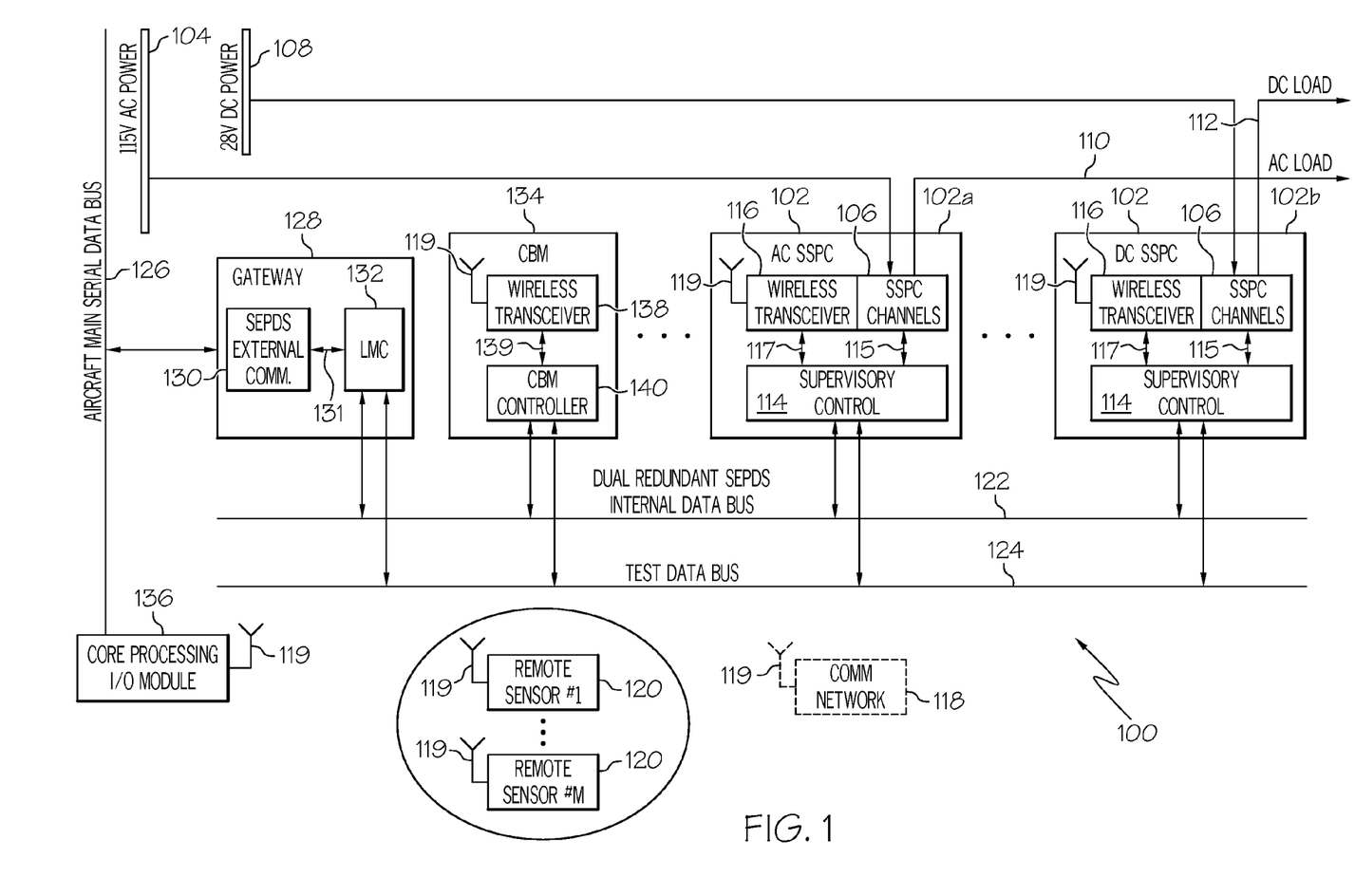
FIG. 1 is a system block diagram for an intelligent electric power distribution system in accordance with one embodiment of the present invention.

FIG. 1 illustrates an electrical power distribution system 100, which may include SSPC modules 102, a CBM module 134, a gateway module 128, remote sensors 120, and a communication network 118 distinct from the data buses (e.g., data buses 115, 122, 124, 126) used for power and load management. As may be recognized by one of ordinary skill in the art, some components typically found in a prior art aircraft secondary electrical power distribution system—such as a control power supply module, backplane, and chassis harness and connector assemblies may not be included in FIG. 1.

Electrical power distribution system 100 may comprise one or more alternating current (AC) or direct current (DC) SSPC modules 102. Each AC SSPC module 102a may be connected to an AC power bus 104, which may deliver AC power at, for example, 115 volts (V) to each of one or more SSPC channels 106 of the AC SSPC module 102a. Similarly, each DC SSPC module 102b may be connected to a DC power bus 108, which may deliver DC power at, for example, 28V to each of one or more SSPC channels 106 of the DC SSPC module 102b. Each of the AC SSPC channels 106 may control AC power 110 to a corresponding AC load (not shown), and each of the DC SSPC channels 106 may control DC power 112 to a corresponding DC load (not shown). Each of the AC SSPC module(s) 102a and the DC SSPC module(s) 102b may be referred to generically as an AC/DC SSPC module 102 or more simply as an SSPC module 102. Each SSPC module 102 may include a supervisory controller 114 interfaced via an internal serial data bus 115 to the SSPC channels 106. Internal serial data bus 115 may be implemented, for example, using an $I^2C$ (inter-integrated circuit) serial bus as known in the art.

Each SSPC module 102 may include a communication module 116 having an interface 117 to supervisory controller 114. Each communication module 116 may be implemented, for example, using a wireless transceiver in communication via antenna 119 with a communication network 118, which may be a wireless communication network. Communication module 116 may provide communication between the SSPC module 102 (via its supervisory controller 114) and other modules and remote sensors 120 of system 100 via communication network 118. Communication network 118 may be implemented as a wireless communication network, for example, using one of the Industrial, Scientific and Medical (ISM) bands, a part of the radio spectrum that can be used by anyone, without a license, in most countries; using ultra-wideband (UWB) radio technology; or using ZigBee®, a wireless standard suitable for sensor applications. Communication network 118 may also be implemented, for example, using other technologies—such as a wired network—and may be distinct and separate from dual redundant SEPDS internal data bus 122, test data bus 124, and aircraft main serial data bus 126. The SSPC modules 102 are further described below with reference to FIGS. 2 and 3.

The wireless remote sensors 120 may be located physically close to the electrical loads. Wireless remote sensors 120 may also be located at particular feeder sections, for example, so as to provide information about arcing, as discussed above. Wireless remote sensors 120 may convert physical quantities into electrical signals and send them over the wireless network. (For example, a remote sensor 120 for a fuel pump could convert the pump flow volume into an analog or digital signal representing the amount of the volume.) The selection of the wireless sensors 120 may depend on the load/feeder health assessment methods chosen, as well as on the individual failure mechanisms of particular loads. The wireless sensors 120 may support non-intrusive and continuous on-line measurements.

Continuing with FIG. 1, system 100 may include a gateway module 128. Gateway module 128 may comprise an SEPDS external communication interface 130 and a load management controller 132.

The SEPDS external communication interface 130 may provide the standard interface between the aircraft main data bus 126 (e.g., the avionics full-duplex switched ethernet (AFDX) network, to which the other major aircraft systems may be connected) and the load management controller 132 of the gateway module 128 via data connection 131. All the communication (e.g., messages exchanged) between the SEPD system 100 and other aircraft systems may be handled by the external communication interface 130.

The load management controller 132 may provide an interface between the SEPDS external communication interface 130 and other modules of system 100—such as condition based maintenance module 134 and SSPC modules 102, which may also be referred to collectively as line replaceable modules (LRMs). The load management controller 132 may communicate with the other line replaceable modules (e.g., CBM module 134 and SSPC modules 102) via the SEPDS internal redundant serial data buses 122 (e.g., controller area network (CAN) buses). This load management controller 132 interface between the aircraft main data bus 126 and internal data buses 122 may allow the external (i.e., external to SEPD system 100) aircraft system to control all the SSPC channels 106 via commands sent over the aircraft main data bus 126 to the load management controller 132. The load management controller 132 may pass these external aircraft system commands to the AC/DC SSPC modules 102 via the SEPDS internal data buses 122. For example, the load management controller 132 may periodically request and receive load status, built-in-test (BIT) results of each AC/DC SSPC module 102, and the prognosis decisions from the CBM module 134. This information may then be sent back to the external aircraft system (e.g., through core processing input/output module 136), via the SEPDS external communication interface 130. The load management controller 132 may also perform all the conventional load management functions for a typical prior art SEPDS. In addition, the load management controller 132 may also provide interfaces to other standard data buses (e.g., RS-485-standard and Ethernet buses) which may facilitate operating software and configuration data loadings, software testing and debugging, and interfaces to other external maintenance equipment (e.g. propulsion data management computer (PDMC)).

Still continuing with FIG. 1, system 100 may include a condition based maintenance module 134. Condition based maintenance module 134 may comprise a communication network interface 138 and a CBM controller 140.

Condition based maintenance module 134 may include a communication network interface 138 having data connection 139 to CBM controller 140. Network interface 138 may be implemented, for example, using a wireless transceiver in communication via an antenna 119 with the communication network 118. Network interface 138 may provide communication between condition based maintenance module 134 and its CBM controller 140 and other modules and remote sensors 120 of system 100 via communication network 118. Network interface 138 may allow condition based maintenance module 134 to receive the information from, for example, the wireless remote sensors 120 and SSPC modules 102 necessary in determining the health condition of the load/feeder system (e.g., the loads (not shown) and connections 110, 112 of system 100 to the loads).

A primary function of the condition based maintenance module 134 may be to post-process the messages received from each SSPC module 102 via the SEPDS internal data bus 122. Condition based maintenance module 134 may post-process the messages along with additional necessary information received directly from the remote sensors 120 via the wireless network 118, and then provide a prognosis for maintenance. A prognosis for maintenance may, for example, project the need for maintenance, identify and locate the defects in detail, and estimate the remaining life of the load/feeder system. A prognosis may, for example, contain the following information: 1) the possible failure modes or the root causes; 2) the most probable failure effects for each failure mode; 3) a proposal for an appropriate maintenance task for each failure mode using failure history, probability, and costs to compare financial and technical feasibility of corrective, preventative, or predictive actions; and 4) recommendations for the SEPDS system 100 or higher control functions (e.g., processor connected to aircraft main data bus 126) to reconfigure the system 100 for more efficient and safer operation.

The CBM controller 140 may provide interfaces to both the SEPDS internal data bus 122, and the wireless communication network 118, and may thus facilitate information collection from the SSPC modules 102 and the remote wireless sensors 120 for the condition based maintenance module 134. The CBM controller 140 may periodically request data directly from SSPC modules 102 and remote wireless sensors 120. The CBM controller 140 may, for example, on request, send the prognosis information received to the gateway module 128 via the SEPDS internal data bus 122. The prognosis information may then be passed, for example, via the gateway module 128, aircraft main data bus 126 and core processing I/O module 136 to external aircraft systems—such as the CMS, or integrated modular avionics (IMA). The CBM controller 140 may also perform "general housekeeping" tasks and periodic built-in-tests (BIT) for the condition based maintenance module 134. CBM controller 140 may interface to the test data bus 124, which may be implemented, for example, on an RS-485 standard, and which may facilitate operating software and configuration data loadings, software testing, and debugging.

Figure 2:
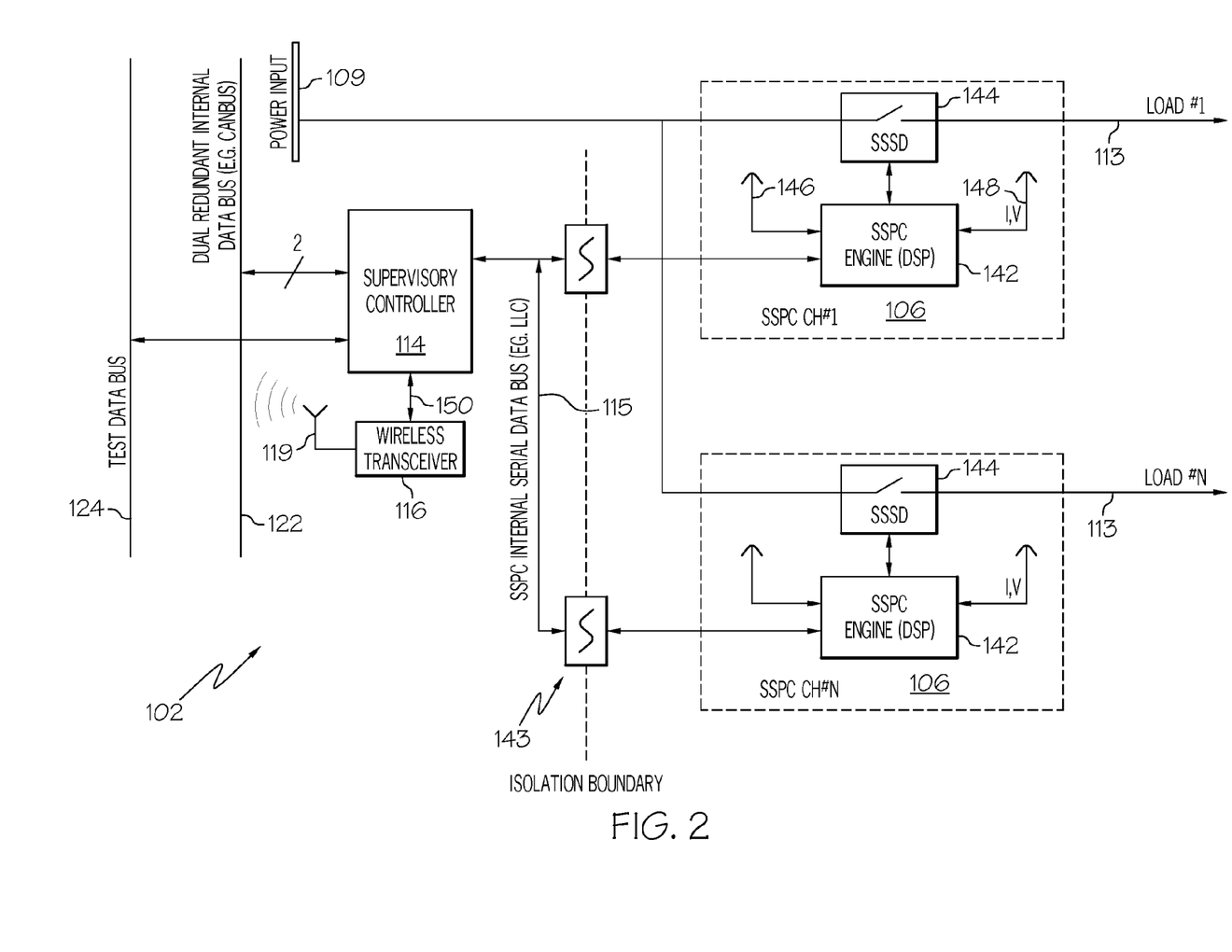
FIG. 2 is a functional block diagram for a solid state power controller module in accordance with one embodiment of the present invention.
Figure 3:
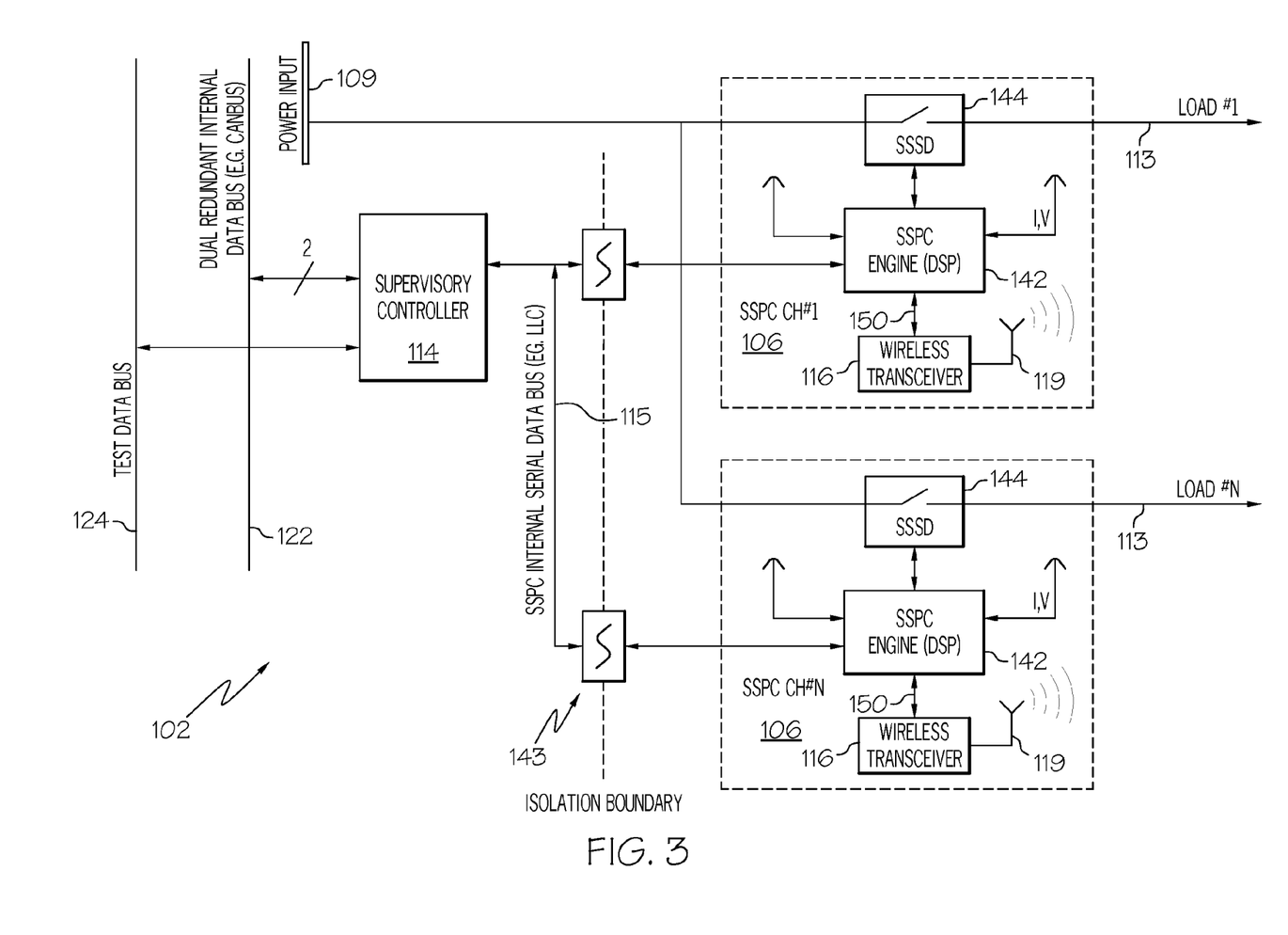
FIG. 3 is a functional block diagram for a solid state power controller module in accordance with another embodiment of the present invention.

Referring now to FIGS. 2 and 3, an SSPC module 102 may comprise a supervisory controller 114, one or more communication modules 116, and one or more SSPC channels 106. A power input 109 may correspond to either an AC power bus 104 or a DC power bus 108, as shown in FIG. 1, that delivers AC or DC power, depending on whether SSPC module 102 is an AC SSPC module 102a or a DC SSPC module 102b. A feeder 113 (also referred to as a "wiring") may thus provide an AC or DC (depending on whether SSPC module 102 is an AC SSPC module 102a or a DC SSPC module 102b) power connection so that the SSPC channel 106 may control AC power 110 (as shown in FIG. 1) to a corresponding AC load or DC power 112 (as shown in FIG. 1) to a corresponding DC load, depending on whether SSPC module 102 is an AC SSPC module 102a or a DC SSPC module 102b.

The supervisory controller 114 may be responsible for control of the SSPC channels, the SSPC status feedback, and the communication between the SSPC module 102 and the gateway module 128 via the SEPDS internal serial data bus 122 (e.g. CAN bus). Supervisory controller 114 may also perform general housekeeping tasks, the SSPC load configuration controls, and periodic built-in-test (BIT) for the module, and may interface to a test data bus 124 (e.g., an RS-485-standard bus), which facilitates operating software and configuration data loadings, software testing and debugging. In addition, the supervisory controller 114 may be equipped with a novel functionality of interfacing to communication network 118 via the wireless communication module 116. This communication network interfacing functionality may allow the SSPC module 102 to receive from the wireless remote sensors 120 the information—other than the load current and voltage, for example, which may already be available directly from each SSPC channel 106 via internal serial data bus 115—necessary in determining the health condition of the load/feeder system, which may include, for example, wirings 113 and loads fed by wirings 113. This communication network interfacing functionality may also serve as a backup mechanism for the SSPC channel 106 controls, in case of lost communication from the SPEDS internal serial data bus 122 and the up stream communication chains (for example, the data bus transceivers, the backplane, and the gateway module 128). As a result, the requirement for the criticality of these communication chains can, thus, be relaxed.

Referring now to FIG. 3 an alternative embodiment of an SSPC module 102 may provide each SSPC processing engine 142 with a wireless communication module 116 (implemented, for example, using a wireless transceiver and antenna 119). Such an alternative embodiment may enhance the ability for each individual SSPC channel 106 to assess its load/feeder (e.g., loads connected to feeders 113 and the feeders 113 themselves) condition and relieve the burden for the supervisory controller 114, as shown in FIG. 3. Thus, in this alternative embodiment, the novel functionality, described above, of interfacing to communication network 118 and receiving health condition information from the remote sensors 120 via the wireless communication module 116 may be distributed to the individual SSPC channels 106. If, however, the health conditions for a majority of aircraft secondary loads can be sufficiently determined by load current and voltage signals alone, the alternative embodiment shown in FIG. 3 may be less cost effective than the embodiment exemplified by FIG. 2.

Returning to both FIGS. 2 and 3, the SSPC module 102 may comprise a plurality of identical, independent and isolated SSPC channels 106. Each SSPC channel 106 may comprise a high power solid state switching device (SSSD) 144 for the main power distribution function. For example, each SSSD 144 may control an AC power 110 or DC power 112 (see FIG. 1) for the load connected to feeder 113 by switching the power on or off from power input 109 to its respective feeder 113. Each SSSD 144 may include an SSSD driver that turns the SSSD 144 "ON" or "OFF" under control of a respective SSPC processing engine 142.

The SSPC processing engine 142 may comprise a dedicated digital signal processor (DSP) or a microprocessor to perform SSPC processing engine functions. For example, the SSPC processing engine 142 may collect and process the information characterizing the health condition of its corresponding electric load and feeder 113 system, through a combination of directly sampled load current and voltage (load current sample 146 and load voltage sample 148) and the sensing signals 150 sent by corresponding wireless remote sensors 120 via wireless communication network 118 (see FIG. 3) and passed over by the supervisory controller 114 via the SSPC internal serial data bus 115 (see FIG. 2). SSPC processing engine 142 may communicate with SSPC internal serial data bus 115 through an isolation boundary 143 as known in the art.

In addition to performing the conventional power distribution and energy based protection tasks (e.g., $I^2t$ tasks where $I^2t$ is a measure of thermal energy associated with current flow. $I^2t$ may be defined to be equal to $I_{RMS}^2 \times t$, where t is the duration of current flow in seconds), the SSPC processing engine 142 may also conduct assessment on the health condition of the connected load/feeder 113 system. Such assessment may include deciding on whether an immediate action to isolate the power input 109 from the load (i.e., disconnect feeder 113 from the load by turning SSSD 144 off) needs to be taken in case of serious faults, or whether a health condition message needs to be sent to the CBM module 134 for further health evaluation as described below for method 200.

Figure 4:
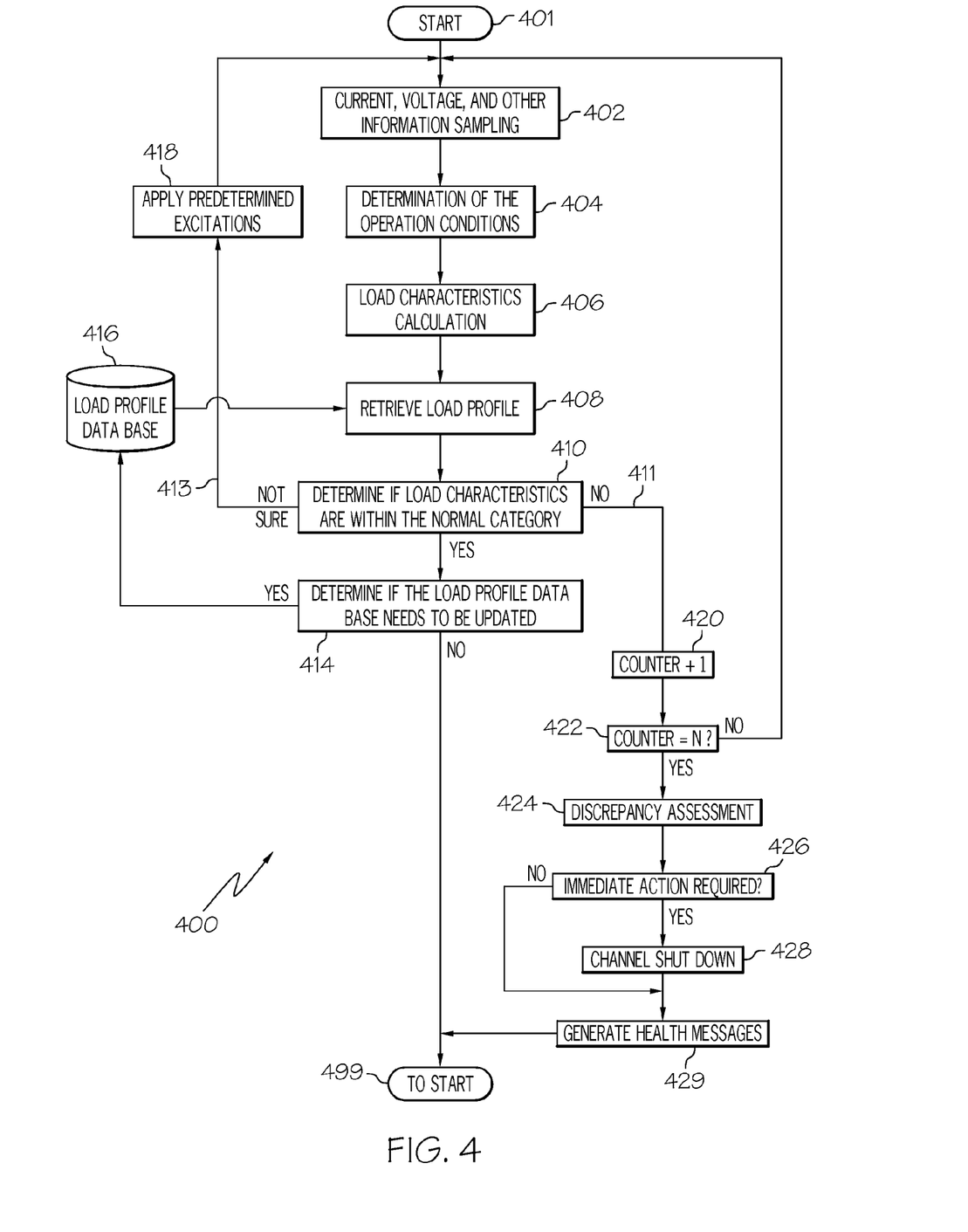
FIG. 4 is a flowchart for a method of distributing electric power that facilitates condition based maintenance, in accordance with one embodiment of the present invention.

FIG. 4 illustrates a method 400 for electric load/feeder health assessment embodying an application of purposely controlled excitations to the load for characterizing the normal behavior of a load/feeder system, e.g., steps 402 through 418 of method 400. By providing a compact normal behavior characterization for the load/feeder system rather than feature extraction of various faults, which could require an extensive and onwardly growing characterization, method 400 may provide an efficient means for detecting faults, e.g., at step 410 and branch 411, by comparing load/feeder system behavior to the normal profile rather than to a list of fault profiles. With such efficient fault detection method 400 may be able to take corrective action, e.g., steps 420 through 429, which may be based on normal profile characterization that goes beyond prior art load current and load voltage sampling available to prior art load management systems, and which may, thus, not be possible for prior art load management systems.

Method 400 may embody the following features: 1) The primary protection function expected from an SEPDS may be to maintain distributed power to the loads during normal operation and normal transients—including inrush—and to interrupt power to a load when the behavior of the load or its feeder circuitry does not conform to the characterization of normal operation; 2) The SSPC channel normal operation characterization can be defined with reasonable margins by a small set of unique characteristics associated with a particular load and its feeder, such that any deviation in the behavior of the load/feeder system from this predefined characterization may be considered to have a negative impact on passenger or aircraft safety; and 3) It is easier to recognize a normal load behavior or feeder characteristic, because it is purposely designed, than to try to characterize faulty situations, which may involve numerous or even potentially infinite possibilities.

Method 400 may execute, for example, on a processor of an SSPC processing engine 142 of an SSPC channel 106. As part of the normal operation characterization, method 400 may (e.g., at steps 402-418) be incorporated with a "learning capability", to allow the SSPC channel 106 to memorize (e.g., using load profile database 416, which may reside in a memory, for example, of SSPC processing engine 142, supervisory controller 114, or condition based maintenance module 134) a variety of load patterns unique to the particular load connected, e.g., via feeder 113. Method 400 may require that a sufficient amount of memory and processing capacity be allocated for each SSPC channel 106. Method 400 may also require that it be possible for the channel 106 to "know and remember" its intended configurations (e.g., the type of loads, the location of the loads, and load ratings), each of which may be associated with a set of unique behavioral patterns during normal operation including transients.

Through continuous sampling (e.g., at step 402) and processing (e.g., at steps 404 and 406) of the electrical signals associated with each channel (e.g. current sample 146 and voltage sample 148), along with any necessary information obtained through remote sensors 120, certain characteristics (for example, the impedance, the phase angle, and the power efficiency) associated with the channel 106 can be obtained. These obtained characteristics may then be used to compare (e.g., at step 410) with the "memorized" load patterns, which may be retrieved from load profile database 416, for example, at step 408.

As part of the "learning capability", method 400 may branch, from step 410 after determining that load characteristics may be within normal for the load profile, to step 414. Step 414 may determine whether or not any new information, which may be obtained via steps 418, 402, 404, and 406, should be added to or modify the load profile. If so, method 400 may update the load profile data base 416 and continue back to step 408. Otherwise, method 400 may continue at step 499 which loops back to "Start" step 401.

If discrepancies are identified (e.g., step 410 proceeds along "no" branch 411 to step 420 after determining that load characteristics are not within the normal category of the load profile characterization) lasting for a predefined period of time (e.g., method 400 increments a counter at step 420 and iterates steps 402 through 422 until a predefined threshold counter value N, which may be any positive whole number, is reached at step 422), indicating the load may be being operated outside its normal operation characterization (e.g., the load characteristics are not within the normal category of its load profile), a discrepancy assessment may be performed at step 424. Discrepancy assessment at step 424 may initiate proper action—such as interrupting the power supply (e.g., at step 428) to feeder 113 by turning SSSD 144 to "OFF" if immediate action is required (e.g. as may be determined at step 426) and notifying the incident to the CBM module 134 (e.g., at step 429) by sending a health condition message via communication network 118. Thus, any faulty event—including, for example, over current, arc fault, and ground fault—which causes a deviation in the SSPC channel 106 behavioral patterns from the category of normal operation can be identified and followed with proper corrective actions.

In order to make the load/feeder condition assessment—and in particular, the "learning capability"—more effective, a predetermined excitation (e.g. a series of short pulse with certain patterns) can be applied to the load through purposely controlled SSSD 144 "ON"/"OFF" actions (e.g., at step 418), during or even after the channel 106 is powered up, without affecting the normal load operations. By proceeding along "not sure" branch 413 from step 410 to step 418, the normal channel response (obtained, e.g., at step 402 in response to controlled excitations of step 418) to a predetermined, controlled excitation may be much more consistent, making it easier to distinguish the faulty situations from the normal operation (e.g. at steps 404, 406, 408, 410, and 414).

It should be understood, of course, that the foregoing relates to exemplary embodiments of the invention and that modifications may be made without departing from the spirit and scope of the invention as set forth in the following claims.

We claim:

1. An electrical power distribution system comprising:
   a solid state power controller (SSPC) connected to a power bus which delivers power to one or more SSPC channels;
   a load receiving power, the power being controlled by the one or more SSPC channels;
   a main data bus in communication with the SSPC via a gateway module; and
   a condition based maintenance module in communication with the solid state power controller via a communication network distinct from the main data bus, wherein the communication network is a wireless network.

2. The system of claim 1 wherein the solid state power controller additionally communicates with the condition based maintenance module using an internal data bus.

3. The system of claim 1 wherein the condition based maintenance module communicates with a core processing I/O module via the communication network.

4. The system of claim 1, further comprising:
   a wireless transceiver connecting the solid state power controller to the communication network.

5. The system of claim 1 wherein:
   the solid state power controller (SSPC) includes a supervisory controller;
   the supervisory controller controls at least one of a plurality of SSPC channels; and further comprising:
   a wireless transceiver connected to the supervisory controller and communicating data with the at least one SSPC channel via the supervisory controller over the communication network.

6. The system of claim 1 wherein:
   the solid state power controller (SSPC) includes a supervisory controller;
   the supervisor controller controls at least one of a plurality of SSPC channels; and further comprising:
   a plurality of wireless transceivers wherein at least one of the wireless transceivers is connected to an SSPC engine of the at least one SSPC channel and communicates data with the SSPC engine over the communication network.

7. The system of claim 1 wherein the condition based maintenance module additionally communicates with a core processing I/O module via an internal data bus in communication with the main data bus.

8. The system of claim 1 wherein the solid state power controller communicates with a core processing I/O module via an internal data bus in communication with the main data bus.

9. The system of claim 1, further comprising
   at least one remote sensor in communication with the communication network.

10. An aircraft secondary electrical power distribution system comprising:
    a solid state power controller (SSPC) that manages power for a load and is in communication with a wireless communication network;
    one or more SSPC channels of the SSPC receives power from a power bus and delivers controlled power to one or more loads;
    one or more solid state switching devices (SSSDs) in each of the one or more SSPC channels, each SSSD controlled by an SSSD driver which causes the SSSD to switch power on and off to the one or more loads;
    a remote sensor in proximity to the load and operable to sense a health condition of the load, wherein the remote sensor is in communication with each channel of the solid state power controller over the wireless communication network; and
    a condition based maintenance module in communication with the solid state power controller over the wireless communication network.

11. The system of claim 10 wherein the remote sensor is in communication with the condition based maintenance module over the wireless communication network.

12. The system of claim 10 wherein the solid state power controller includes a supervisory controller connected to a transceiver in communication with the wireless communication network.

13. The system of claim 10 wherein the solid state power controller (SSPC) controls a plurality of SSPC channels and each SSPC channel has a distinct one of a plurality of transceivers in communication with the wireless communication network so that each SSPC channel is independently in communication with the wireless communication network.

* * * * *